United States Patent [19]

Edwards

[11] Patent Number: 4,718,757
[45] Date of Patent: Jan. 12, 1988

[54] IMAGING ENHANCEMENT METHOD

[76] Inventor: Clarence C. Edwards, 4256 E. Capitol St., Washington, D.C. 20019

[21] Appl. No.: 895,901

[22] Filed: Aug. 12, 1986

[51] Int. Cl.$^4$ .................. G03B 17/50; G03B 29/00
[52] U.S. Cl. ................................. 354/76; 354/86;
355/27; 355/77; 430/206; 430/357; 378/210;
346/110 R
[58] Field of Search .................. 354/76, 83, 84, 85,
354/86, 87, 304; 355/27, 77, 20; 430/206, 207,
236, 357, 404; 346/110 R; 378/100, 183, 210;
128/660

[56] References Cited

U.S. PATENT DOCUMENTS

| 3,608,454 | 9/1971 | Shenk | 354/86 |
| 3,696,720 | 10/1972 | Vinson | 355/20 |
| 4,191,962 | 3/1980 | Sramek | 346/110 R |
| 4,341,454 | 7/1982 | Baker | 354/304 |

Primary Examiner—A. A. Mathews
Attorney, Agent, or Firm—Irvin A. Lavine

[57] ABSTRACT

Image-enhancement is achieved by the use of instant color film. Such film has a predetermined development time, and after exposure of one print, it is developed and then development is stopped, usually before the normal development time. Another exposure is made on a second film of the same type, such as another print from the same film pack, and development is stopped after a different time. At least one of the prints is developed for a time less than the normal development time of the film. The resulting prints are of different colors, and are viewed together.

10 Claims, 7 Drawing Figures

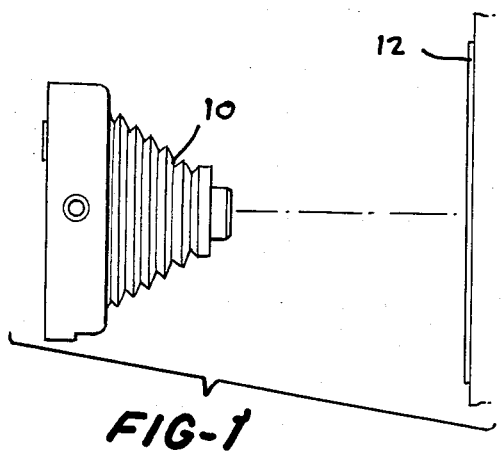
FIG-1
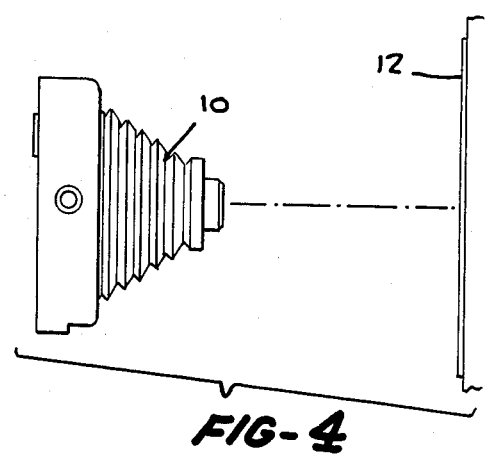
FIG-4
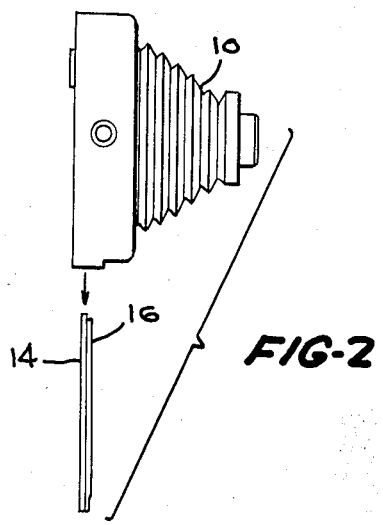
FIG-2
FIG-3
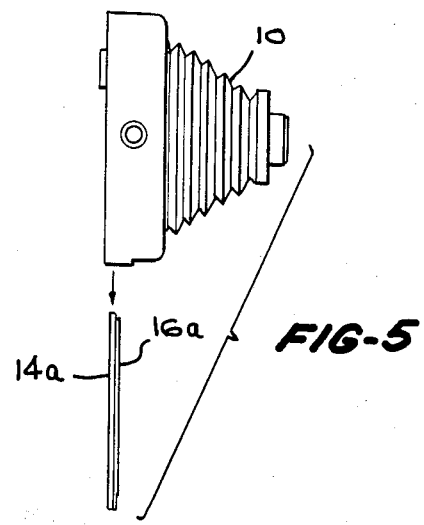
FIG-5
FIG-6
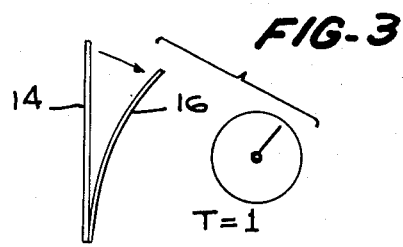
T=1
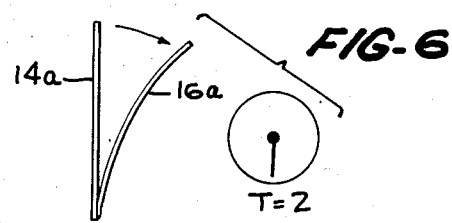
T=2
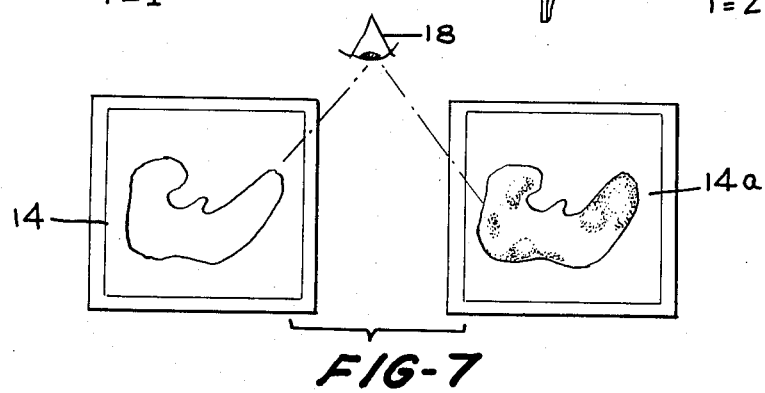
FIG-7

IMAGING ENHANCEMENT METHOD

BACKGROUND OF THE INVENTION

This invention relates to image-enhancement through color photography.

There has been recognized in the field of imaging a need for the enhancement of the images provided by such objects as oscilloscopes, i.e., cathode ray tube displays which are used in many diagnostic and viewing techniques, including particularly medical diagnostic procedures. As an example, the fields of ophthalmology, obstetrics, and cardiology have greatly benefitted from ultrasonography. In this technology, typical equipment includes a transducer which produces bursts of ultrasonic energy which are directed into human tissue as a collimated or focused beam. This beam strikes a tissue or fluid interface of different density, resulting in sonic echos which are reflected back to the transducer, where those sonic echos are converted into electric impulses, which are then amplified and displayed on an oscilloscope or cathode ray tube. There may be displayed by the oscilloscope an echo anatomic outline of structure beneath the skin, and provide a cross-sectional display of, for example, the eye, a pregnant abdomen or an internal organ such as the heart.

The oscilloscope display is a gray continuous tone image, varying between black and white at different portions of the image. In the medical field, radiologists and other physicians are trained to analyze the displayed image to provide evaluations of normal and abnormal conditions.

It has been recognized that the human eye has relatively poor gray scale performance; that is, the eye cannot discriminate over as wide a range of intensity levels as is desirable in order to assist in the interpretation and understanding of such oscilloscope continuous tone images. Recognition of the foregoing fact has led to the development of color-coded images, which has been accomplished with complex electronic equipment in which a color is arbitrarily assigned to each small range of magnitude of the ultrasonic pulse echo. This is in some respects similar to the arbitrary assignment of a part of the gray scale to similar small ranges in the magnitude of the reflected echo pulse. Color-coding of oscilloscopes has some limitations, and one of the more successful uses of color in coding is with relatively simple images which have few details and only slowly varying intensities.

Not only is the image on an oscilloscope screen viewed and diagnosed, but similar images provided by X-rays, are also viewed and diagnosed. This occurs both in the medical field, and other fields, including inspection of structures for hidden flaws, etc.

It is sometimes necessary to provide a fixed record or an additional fixed record of an oscilloscope image. For example, where a radiologist reads a X-ray or a set of X-rays, the information which he obtains and his opinion relative to the subject has to be given to another physician. In some instances, duplicate X-rays are provided to the other physician, and in some instances this may require as many as fifteen to twenty separate X-ray films. Where radiomagnetic imaging is used, as many as fifty different sheets may be required to be duplicated. Duplication is necessary where the radiologists and the physician are not in close proximity, and the treating physician considers it necessary to see the film in order to be properly guided by the evaluation provided by the radiologist. The production of duplicate X-ray films is often unduly time-consuming where time may be of great significance, and is always an added cost.

It has been the practice of some physician to preserve a record of the image obtained of a patient through sonography, and this has usually been achieved by photographing the image on the oscilloscope. Since the image is in black and white, black and white film was used.

SUMMARY OF THE INVENTION

The enhancement is provided of continuous tone image of an oscilloscope, and X-ray, or other object of this nature. Use is made of "instant color film", which in one example, operates on the diffusion transfer principle. Such film is commercially available under the designation POLAROID, Type 668 and Type 669. This film has a full development time of sixty seconds, with the developer being carried by a separate sheet provided as a part of each film photographic sheet. The object, such as an oscilloscope or an X-ray is photographed, and where a film pack is used, the "print" is removed from the camera, and development of the image is stopped after a predetermined length of time which is prior to the full development time for the film. A second photograph is made of the same image, using, for example, another "print" of the film pack. This second "print" is removed from the camera and its development is at a different time than with the first "print". The stopping of development is effected by removing the developer sheet. The development time for the second print may be more or less than that of the first print, and may be at the full development time of the particular film being used. As many additional photographs as desired may be taken, with the halting development of the process effected after other time periods before full development; one of the prints may be permitted to be fully developed.

The various photographs, all of the same object, will have different colors. By examining and comparing the plural photographs, there is achieved enhancement of the image viewed, with additional perception obtained of the image provided on the oscilloscope, x-ray, etc.

Among the objects of the present invention are to provide for image-enhancement of the image of an object having a continuous tone image, to provide for image-enhancement of such an object at a relatively low cost, to provide for a permanent record of a continuous tone image, and to provide a method in which a continuous tone image may be enhanced rapidly, permanently, and without the requirement for expensive and complicated equipment.

BRIEF DESCRIPTION OF THE DRAWING

FIG. 1 is a schematic view illustrating the photographing of an object using instant color film.

FIG. 2 is a schematic illustration of color film discharged from a camera.

FIG. 3 is a schematic illustration of a development sheet being separated from the color film after a particular time.

FIG. 4 is a schematic representation of a second color film being exposed to the image of the same object.

FIG. 5 is a schematic view showing the color film removed from the camera.

FIG. 6 is a schematic view showing the separation of a developer sheet from the color film.

FIG. 7 illustrates the viewing of the two color prints obtained by the foregoing step.

DESCRIPTIONS OF THE PREFERRED EMBODIMENTS

In accordance with the present invention, use is made of so-called "instant color film". Such a film typically has a plurality of layers, each containing an emulsion sensitive to a particular color, such as blue, green and red. There is provided in association with the film a developer sheet containing developer(s) for the emulsions, the developer being in, for example, micro-capsules which are ruptured by pressure. In normal usage, after an image has been exposed, a film "print" is removed or ejected from the camera, the action causing rupturing of the micro-capsules, which then develops the various emulsions. The developer sheet is detachable or separable and development is typically completed in approximately sixty seconds after initiation by removal from the camera, at 75° F. At that time, a sheet containing the developer is removed from the "print" to provide a photographic print in substantially full color. Because the print is available immediately after the exposure of the film, it is called "instant film".

A characteristic of the film above-described is that the development of the emulsions is sequentially timed. That is, certain emulsions are developed within, for example, the first five seconds after the developer is released and other emulsions complete their development at other times from initiation of color development.

Referring now to the drawings, FIG. 1 provides, in schematic form, an illustration of an instant camera 10 directed so as to take a photograph of an object 12. The object may be, preferably, one which provides a continuous tone image. Examples of such objects are an oscilloscope display and an X-ray film. Thus, in the first step, the object 12 is photographed by imparting its image onto photographic film of the type above specified or similar, within the camera 10.

FIG. 2 illustrates the second step in which there is removed or ejected from the camera 10 a first instant color film 14 having a separable developer-carrying sheet 16 associated with it. In FIG. 3, there is illustrated the removal or separation of the developer sheet 16 from the film 14, at a time T=1 after initiation of development.

FIG. 4 illustrates the photographing of the object 12 with the camera 10 in the same manner as in FIG. 1. FIG. 5 illustrates the step of the ejection or removal from camera 10 of another film 14a having a separable developer sheet 16a. As shown in FIG. 6, after a development time T=2, different from time T=1, the separable developer sheet 16a is removed from the film 15a.

As a result of the foregoing steps, there will be produced two color prints 14 and 14a, which have had their developments stopped at different times. As a result, the two instant color prints 14 and 14a will have different colors as discussed hereinbelow. The two prints 14 and 14a are then placed adjacent each other and viewed by an observer 18. The prints 14 and 14a will be of the same object, but will display that object in different colors due to the different development times permitted, at least one of which is for a lesser time than the full development time of the film used.

There are preferably used, in performing the steps as hereinabove discussed, such film as POLAROID Type 669 or POLAROID Type 668. Both of these films are commercially available, providing eight individual films 14, 14a, etc, with developer sheets 16, 16a, etc. in a single film pack. Thus, after ejection or removal of one such film and sheet from the camera, the next film of that pack is automatically placed in position for use and exposure.

Using standard POLAROID Type 669 film, and with an oscilloscope having positive polarity, that is, with the background light, development was stopped after five seconds; the image was a pale blue and the background was ivory/white. A second exposure on another POLAROID Type 669 film was permitted to develop for approximately fifteen seconds, and resulted in the image being a magenta-blue with the background being a light blue. At twenty seconds development time of the next exposure, the image was a darker blue, with portions in varying shades, and the background remained a light blue. Development of other exposures for increasing amounts of time had little change on the background, while at thirty seconds, the image was deep blue, approaching black in some parts, and with subsequent exposures developed for greater than approximately 35 seconds, there was little change in the color of the image.

On oscilloscopes where there is polarity-reversal, the background can be changed to be dark, instead of light, as occurs with a positive polarity image on the oscilloscope. Using the same type film, and with negative polarity of the oscilloscope, after five seconds of development, the image was white to blue-green and the background was pale green. After ten seconds, there was only slight change in the color of the image, up to full development at sixty seconds but the background changed as each successive exposure was permitted to develop for a longer period of time. Thus, at ten seconds, the background became a tan-brown, after fifteen seconds the background was light brown, and after twenty seconds the background was a deeper brown. Permitting further development time in successive exposures resulted in ever deeper browns, until at sixty seconds, the background was a brownish black.

Although the above changes in color for both positive and negative polarity have been stated in changes in the time of development at five second intervals, the development time increments may be less or more than that. In practice, it has been found that as many as fifty-six different images, having development times of approximately one second difference may be made with approximately fifty-six different color prints made of the same oscilloscope image.

It has been found, in comparison to analyzing and the information provided by an image such as a continuous tone oscilloscope or X-ray, that the information provided by comparing multiple prints produced by the above-described method enhances the ability of the observer to comprehend and evaluate the information provided by the imaging equipment. Not only is the understanding of the information enhanced, it is also more readily comprehended by the trained observer, such as a radiologist or other trained person. Further, it has been found that the lay person is able to perceive and comprehend certain aspects of the image, through consideration of the color prints obtained by the present method, in contrast to an inability, for the most part, for such lay persons to comprehend much of the information in the image of an oscilloscope, X-ray, or a photograph of either of them.

It has also been found that some enhancement of the various color prints obtained by the process may be achieved by multiple exposures of the same "print". The effect of this is to cause the darker areas to be darker and the lighter areas to be lighter, other factors being equal. Among those other factors are the brightness of the object photographed, ambient light, temperature, and time of development.

Further, in comparison to multiple X-rays or radiomagnetic images, a lesser number of color photographs made in accordance with the present method can be provided to satisfy the requirements of another person engaged in analysis, such as an attending physician, or a consulting radiologist.

The photoprints produced by the present method are relatively permanent, no fading or alteration of colors having been observed after a period of some months following exposure and development.

There has been provided a method for enhancing the image of an object such as a continuous tone image provided by an oscilloscope and by an X-ray. The method uses inexpensive equipment, including a camera and existing photographic instant color film. Hence, equipment for practicing the present method is readily available and is economical to acquire. The results produced provide substantially enhanced imaging and improved understanding and comprehension of the data on the basic oscilloscope or X-ray image.

I claim:

1. A method of enhancing the understanding of the information provided by the image of an object such as an image displayed on an oscilloscope display comprising:
   (a) photographing the object with instant color photographic film containing materials which exhibit different colors upon exposure and subsequent development by developer material associated with the film, the film being fully developed after a predetermined time;
   (b) initiating development of said film;
   (c) stopping development of said film after a predetermined time following initiation of development;
   (d) photographing the object with a second instant color photographic film as in step (a);
   (e) initiating development of said second instant film;
   (f) stopping the development of said second film after a predetermined time following initiation of development of said second instant film, said time of development of said second instant film being different from the time of development of said first instant film sufficient to provide an observable color distinction between said two films, and at least one of said times of development being less than the full development time of said film; and
   (g) viewing said films to thereby obtain enhancement of the understanding of the information provided by the image of said object.

2. The method according to claim 1, comprising the photographing of an oscilloscope display.

3. The method of claim 1, comprising the photographing of an x-ray film.

4. The method of claim 1, comprising photographing a continuous tone image.

5. The method according to claim 1, and further comprising photographing the object with at least one additional photographic film as in step (a), and stopping development thereof at a different time than of the other said films, and at a time less than the full development time of said film.

6. The method of enhancing the understanding of the information provided by the image of a continuous tone object comprising exposing the image onto multiple instant color photographic films which contain (a) materials responsive to different colors, and (b) means carried by a separate sheet for fully developing said materials after a predetermined period of time, and which sheet is detachable to stop development, separating a said sheet from one said exposed film of said object at a different time than a said sheet from a different exposed film of said object, said time difference being sufficient to provide an observable color distinction between said two films, at least one of said separating steps being effected in a lesser time than required for full development of said film, so that said films provide images of said continuous tone object in observably different colors, and viewing said films.

7. The method of claim 6, and further comprising exposing an oscilloscope to said films.

8. The method of claim 6, and further comprising exposing an x-ray to said films.

9. The method of claim 6, wherein at least two said films have said image exposed onto them.

10. The method of claim 6, wherein more than two said films have said image exposed onto them, and at least two said films have the said sheet thereof separated therefrom to stop development at different times which are less than the time required for full development of said film.

* * * * *